United States Patent [19]

Dufour

[11] 4,298,716

[45] Nov. 3, 1981

[54] STYRENIC TETRAPOLYMER

[75] Inventor: Daniel L. Dufour, Longmeadow, Mass.

[73] Assignee: Monsanto Company, St. Louis, Mo.

[21] Appl. No.: 137,078

[22] Filed: Apr. 3, 1980

[51] Int. Cl.$^3$ .............................................. C08F 22/06
[52] U.S. Cl. ...................................... 526/65; 525/74; 526/272
[58] Field of Search ..................... 525/74; 526/272, 65

[56] References Cited

U.S. PATENT DOCUMENTS

| | | | |
|---|---|---|---|
| 2,439,227 | 4/1948 | Seymour et al. | 526/272 |
| 2,971,939 | 2/1961 | Baer | 260/45.5 |
| 3,509,110 | 4/1970 | Di Giulio et al. | 526/272 |
| 4,141,934 | 2/1979 | Wingler et al. | 525/53 |
| 4,145,375 | 3/1979 | Cutter et al. | 526/272 |
| 4,167,543 | 9/1979 | Liebig et al. | 525/74 |

Primary Examiner—Paul R. Michl
Attorney, Agent, or Firm—David Bennett; William J. Farrington; Edward P. Grattan

[57] ABSTRACT

A tetrapolymer of α-methylstyrene, styrene, maleic anhydride and acrylonitrile is prepared by mass/suspension batch process without the need for staged late addition of monomers. The tetrapolymer is useful as a replacement for SAN as diluent in the preparation of ABS-type polymers.

3 Claims, No Drawings

STYRENIC TETRAPOLYMER

BACKGROUND OF THE INVENTION

This invention relates to styrenic tetrapolymers and specifically to a process for the production of such tetrapolymers.

The tetrapolymers of the invention are particularly useful in the production of a commercial ABS formulation with advantageous properties.

As is well known in the art an ABS polymer essentially comprises particles of a diene rubber substrate grafted with styrene and acrylonitrile dispersed in a matrix polymer comprising styrene and acrylonitrile. In one variation of such ABS-type polymers, part or all of the styrene is replaced by α-methyl styrene in the matrix polymer. This has the effect of raising the heat distortion temperature of the ABS by several degrees.

Unfortunately this technique has only a limited capacity for producing distortion temperature improvements in a commercially acceptable product. The present invention however indicates that ABS polymers with much better heat distortion characteristics can be obtained using a tetrapolymer prepared by the novel process herein described.

DISCUSSION OF THE PRIOR ART

It is known that if styrene is polymerized with maleic anhydride in the mass or in the presence of a solvent there is a tendency for the monomers to polymerize in a 1:1 molar ratio until one of the monomers is substantially used up. This is taught for example in U.S. Pat. No. 2,971,939 which also shows that the proportions of the monomers in the final polymer can be controlled by gradual addition of the maleic anhydride during polymerization. This technique has been the procedure of choice whenever styrene is polymerized with maleic anhydride and is described, in a modified fashion, in for example U.S. Pat. Nos. 4,141,934 and 3,919,354.

The incorporation of a given amount of maleic anhydride comonomer in a styrenic polymer is known to have a distinct advantage in that it raises the heat distortion temperature of the resultant copolymer. The incorporation of acrylonitrile as a third comonomer however raises certain problems in that as the composition increases in maleic anhydride and acrylonitrile content the compositions become non-moldable. This is taught for example in U.S. Pat. No. 2,439,227.

A process has now been found by which copolymers comprising styrene, maleic anhydride and acrylonitrile can be obtained in a form that makes them suitable for incorporation in molding compositions. The process moreover is simpler since it does not require staged (late) additions of any monomeric component.

The copolymer obtained is essentially of uniform composition and is suitable for use as at least a partial replacement for the styrene/acrylonitrile matrix copolymer in an ABS composition. Such ABS compositions have excellent physical properties and a much higher heat distortion temperature than is available using conventional variations in the formulation.

GENERAL DESCRIPTION OF THE INVENTION

The invention described herein comprises a process for the production of a thermoformable composition which comprises:

A. forming a reaction mixture comprising styrene, α-methyl styrene, an ethylenically unsaturated nitrile and an ethylenically unsaturated dicarboxylic acid anhydride wherein the molar proportions of the components are such that:

(i) styrene + α-methyl styrene represents from 45–60%;
(ii) nitrile + anhydride represents from 40–55%;
(iii) α-methyl styrene represents from 10–50%; and
(iv) nitrile and anhydride each individually represent at least 10% of the monomers present in the reaction mixture;

B. polymerizing the mixture in the absence of a dispersing medium till at least 40% conversion; and C. substantially completing polymerization in aqueous suspension.

The mass polymerization process of stage B above can sometimes be aided by the presence of a suitable solvent such as an aromatic hydrocarbon or a ketone. A preferred solvent for such a reaction is methyl ethyl ketone (MEK).

The polymerization can be carried to a monomer conversion of from 40 to 60% in the absence of a solvent or even to from 80 to 90% in the presence of a ketone solvent such as MEK. The polymerization mixture is then dumped into suspension in water and the polymerization continued to substantial completion.

Since the polymerization is finished in suspension it is desirable to reform any anhydride that has been lost by hydrolysis and this can conveniently be done in a vented extruder either in a separate operation or at the same time that the polymer is being formulated with any desired additives and formed into pellets.

THE POLYMERIZATION MIXTURE

The monomers present in the reaction comprise styrene, α-methyl styrene, an unsaturated nitrile and an unsaturated anhydride. The unsaturated nitrile is usually acrylonitrile or methacrylonitrile with the former preferred. The unsaturated anhydride is conventionally maleic anhydride but the unsaturated anhydrides such as itaconic, citraconic and aconitic anhydrides can be substituted in whole or in part.

The key to the utility of the process of the invention is the presence of the α-methyl styrene which appears to act not only as a monomer but also as a chain transfer agent. Regardless of theory, it is found that with α-methyl styrene present in a proportion of 10–50% by weight, and preferably 15 to 30% based on the monomer mixture, it is possible to obtain a homogeneous thermoplastic composition by the mass polymerization process described above.

The weight proportion of the combination of styrene and α-methyl styrene in the monomer mixture is from 45 to 60% but within that range 50–55 weight % is preferred.

The sum of the weight proportions of nitrile and anhydride is from 40 to 55% and preferably from 45 to 50% with at least 10% of each, based on the total monomer content. The individual proportions selected are determined in part by the properties that are required for the final polymer. In general increasing the anhydride content improves the heat distortion temperature of the polymer but too high an anhydride content can lead thermal instability at elevated temperatures. Thus above a weight percentage above about 25% of maleic anhydride the thermal stability can be a concern that is only partially controllable by use of stabilizing additives.

As will be appreciated, performing the second stage of the reaction in suspension leads to some degree of hydrolysis of the anhydride groups on the maleic anhydride and the degree to which this occurs depends on the monomer conversion at the time the polymerizing mixture is dumped into suspension. For this reason it is preferred to carry the mass polymerization stage to as high a degree of conversion as is feasible before dumping.

The reformation of the anhydride groups is carried out by heating the polymer to drive off water. This is most conveniently done during some other operation, as for example during extrusion using a vented extruder though double extrusion may be required to complete reformation of the anhydride. Other devolatilization techniques such as a wiped film devolatilizer can also achieve a measure of success in reforming the anhydride.

POLYMERIZATION PROCESS

As indicated above the first stage of the polymerization is conducted in the mass; that is in the absence of a dispersing medium. Polymerization of a simple monomer mix is an effective route but it is found that between about 40 and 60% monomer conversion, the viscosity of the mixture has grown to such an extent that agitation and heat transfer become difficult. For this reason it is often preferred to polymerize the monomers in solution in an inert solvent that may be an aromatic hydrocarbon such as benzene, toluene or xylene or an ether or ketone such as acetone, methyl ethyl ketone, diethyl ether, dioxane, diacetone, cyclohexanone and the like. The solvent of choice is usually methyl ethyl ketone.

The volume of solvent used can be up to 50% the volume of the reaction mixture but usually it will be between 0 and 30% of the volume of the mixture.

When a solvent is used the polymerization can, if desired, be taken to a much higher monomer conversion level such as 80 to 90% or even more.

The polymerization is catalytically initiated by any of the free radical catalysts conventionally used to polymerize styrene. These can include various peroxides such as benzoyl peroxide, dicumyl peroxide, di-tert-butyl peroxide; peracid esters such as the tert-butyl esters of perbenzoic acid, peroctoic acid and peracetic acid; azocompounds such as azobisisobutyronitrile; hydroperoxides such as cumene hydroperoxide and tert-butyl hydroperoxide, and the like free-radical generating catalyst systems.

The temperature is conventionally held below about 120° C. in such reactions but the precise temperature selected depends to some extent on the desired course and speed of reaction and upon the nature of the catalyst selected.

After completion of the mass polymerization the mixture is dumped into suspension in water along with a suitable suspending agent and the polymerization is continued to substantial completion. Where a solvent is used in the initial stage of polymerization it is clearly desirable that it does not interfere with the formation of the suspension in the subsequent stage. For this reason a water-miscible solvent such as MEK is often preferred.

Conventional suspending agents for the suspension polymerization of styrene polymers may be used in this part of the reaction. Suitable suspending agents include polyvinyl alcohol, cellulose ethers such as methoxycellulose, water soluble sulfonate polystyrenes and salts thereof; water soluble salts of acrylic acids such as acrylic acid/2 ethyl hexyl acrylate copolymers or methacrylic acid/hexyl acrylate copolymers; poly (N-vinyl pyrrolidone) and similar conventional suspending agents. The amount of such suspending agent is typically from 0.1% to 1% and preferably from 0.3% to 0.7 wt.% based on the polymer weight.

The water to monomer weight ratio in the suspension phase can be for example 0.6:1 or higher. At low ratios however control problems can be encountered so that water to monomer weight ratios of at least 0.8:1 or higher are preferred.

The reaction mixture is usually treated with an antifoam additive at the end of the polymerization in suspension so as to facilitate water separation and drying of the beads.

The presence of α-methyl styrene is, as indicated above, a critical feature of the present invention. It is found that the speed with which the polymerization progresses and the feasibility of getting a uniform polymer by a process that does not involve late addition of the anhydride monomer depends to a significant extent on the presence of the α-methyl styrene component. Thus with no 60-methyl styrene and all the styrenic component provided by styrene itself, the reaction is very fast and often a genuinely uniform thermoplastic polymer cannot be obtained. The incorporation of α-methyl styrene appears to moderate the reaction and, over the composition range described, leads to the production of substantially uniform thermoplastic polymers of great utility. It is found to be highly advantageous to incorporate an additive into the reaction mixture to give tetrapolymer improved stability at elevated temperatures such as are used during the devolatilization process for example. Suitable stabilizers include 1,3,5-tri methyl-2,4,6-tris-[3,5-ditertiary-butyl-4-hydroxy benzyl] benzene; 2,2 methylene-bis-(4-methyl-6-tertiary butyl phenol) terephthalate; tris [alkylphenyl] phosphites; tris(2-methyl, 4-hydroxy, 5-tertiary butyl phenyl butene); n-octodecyl, 3-[3,5 ditertiary butyl, 4-hydroxy phenyl propionate]; and tetrakis [methylene (3,5-di-ter-butyl-4-hydroxyhydrocinnamate)] methane.

DESCRIPTION OF THE PREFERRED EMBODIMENTS

The invention is further described with reference to the following examples which are for the purposes of illustration only and should not be taken to imply any limitation on the essential scope of the invention.

EXAMPLE 1

This Example describes the production of a number of tetrapolymers by the process of the invention and describes the properties of certain of the tetrapolymers produced.

In each case the monomers were charged to a reactor in the molar proportions specified along with 1.6 g (0.1 parts by weight) of di-tertiary butyl perbenzoate and 3.2 g (0.2 parts by weight) each of antioxidants tris(alkyl phenyl) phosphite and N-octa decyl 3[3,5 ditertiary-butyl-4-hydroxy phenyl propionate].

The monomers were then heated to the specified polymerization temperature and the time at which the temperature reached 70° C. was taken as the zero batch time and the batch was held at the polymerization temperature for the specified time.

At the end of that time the suspension system comprising 1520 g. of water 4.8 g. of a copolymer of acrylic acid with ethyl hexyl acrylate (95:5 molar ratio), 2.4 g of a virtually completely hydrolyzed polyvinyl acetate, and 10 g of sodium sulfate was added and the suspension held for the time indicated. At the end of that time 15 g of Teafor D.10, (an antifoam agent available under that trade name from ABM Chemicals) were added and the mixture was heated to 160° C. and the organic phase containing the unreacted monomer was removed.

The batch was then cooled and the solid polymer particles were washed and dried.

The details of the various polymerization runs are set forth in Table I.

TABLE I

POLYMERIZATION CONDITIONS

| | Weight Proportions | | | | Mass Phase | | Suspension Phase | | | Strip | |
|---|---|---|---|---|---|---|---|---|---|---|---|
| | | | | | Time | Temp. | Water Monomer | Time | Temp. | Oil Phase | Aqueous Phase |
| Run | α-MS | MA | AN | S | hr.min. | °C. | Ratio | hr.min. | °C. | % | pH |
| *1 | 54 | 24 | 22 | | 2.06 | 95 | 1:1 | 11.00 | 110 | 8 | — |
| 2 | 25 | 15 | 40 | 20 | 1.28 | 95 | 1:1 | 5 | 105 | 8 | — |
| 3 | 25 | 15 | 40 | 20 | 2.50 | 95 | 1:1 | 5 | 100 | 10 | — |
| 4 | 25 | 15 | 40 | 20 | 2:45 | 95 | 1:1 | 5:15 | 100 | 6 | — |
| 5 | 28 | 15 | 34 | 23 | 2:45 | 95 | 1:1 | 5:20 | 105 | 5 | — |
| 6 | 28 | 15 | 34 | 23 | 3:15 | 95 | 1:1 | 5:25 | 105 | 13 | 2.5 |
| 7 | 28 | 15 | 34 | 23 | 4:00 | 95 | 1:1 | 4:50 | 105 | 11 | 1:5 |
| 8 | 28 | 15 | 34 | 23 | 6:05 | 95 | 1:1 | 6:45 | 105 | 11 | — |
| 9 | 28 | 15 | 34 | 23 | 4:05 | 95 | 1:1 | 3:45 | 105 | 11 | — |
| 10 | 25 | 15 | 40 | 20 | 4:00 | 95 | 1:1 | 4:50 | 105 | 16 | 1:5 |
| 11 | 28 | 15 | 34 | 23 | 4:00 | 95 | 1:1 | 4:50 | 105 | 13 | 1:0 |
| *12 | 58 | 13.4 | 26 | 2.6 | 2.0 | 100 | 1:1 | 4:00 | 100 | 19 | 1:5 |
| *13 | 16 | 21 | 13 | 50 | 2:50 | 95 | 1:1 | 4:00 | 105 | 22 | 1:5 |
| *14 | 26 | 21 | 13 | 40 | 2:30 | 95 | 1:1 | 2:15 | 105 | — | — |
| 15 | 28 | 15 | 34 | 23 | 4:00 | 95 | 4:5 | 5:00 | 105 | 21 | 1:5 |
| 16 | 28 | 15 | 34 | 23 | 4:00 | 95 | 3:5 | 5:00 | 105 | 18 | 1:5 |
| 17 | 28 | 15 | 34 | 23 | 4:30 | 95 | 3:5 | 5:00 | 105 | 22 | 2:0 |
| 18 | 28 | 15 | 34 | 23 | 4:30 | 95 | 3:5 | 5:00 | 105 | 13 | 2:0 |
| 19 | 29.2 | 16.6 | 30 | 26.4 | 5:00 | 95 | 3:5 | 5:00 | 105 | 5 | 2:0 |
| 20 | 29.2 | 16.4 | 30 | 24.4 | 3.65 | 95 | 3:5 | 5:00 | 105 | 5 | 2:0 |
| 21 | 29.2 | 16.4 | 30 | 24.4 | 4:00 | 95 | 4:5 | 5:00 | 105 | 15 | 2:00 |
| 22 | 29.2 | 16.4 | 30 | 24.4 | 4:45 | 95 | 1:1 | 5 | 105 | 18 | 1:5 |
| 23 | 28 | 15 | 34 | 23 | 4:50 | 95 | 1:1 | 5 | 105 | 23 | 1:0 |
| 24 | 29.2 | 16.4 | 30 | 24.4 | 5:00 | 95 | 1:1 | 5 | 105 | — | 2:0 |

*Runs not illustrative of the invention.
All runs had achieved at least 40% conversion of monomer to polymer when the suspension was formed.

Several of the polymers obtained in the runs described above were tested for their (1) 5 kg Vicat heat distortion temperature by the method described in ISO R-306 Method B, (2) their Melt Flow Index at 220° C. under a 10 kg. load by the method described in ISO DIS 2580 and (3) their specific viscosity using a viscosimeter and the Huggins' formulation at 25° C. in dimethyl formamide.

The results are set forth in Table II below.

TABLE II

| Run No. | Vicat (°C.) | MFI (g/10min.) | Sp. Visc. (cps.) |
|---|---|---|---|
| *1 | 90 | (Too fast) | — |
| 2 | 85 | 82 | 0.041 |
| 3 | — | 88 | 0.063 |
| 4 | 118 | 1.0 | 0.063 |
| 5 | — | 4.9 | 0.056 |
| 6 | 119 | 9.7 | 0.068 |
| 7 | 134 | 1.1 | 0.044 |
| 8 | 122 | 6.6 | 0.057 |
| 9 | 126 | 0.57 | 0.082 |
| 10 | 128 | 0.55 | 0.084 |
| 11 | 129 | 4.3 | 0.078 |
| *12 | 91 | (Too fast) | — |
| *13 | 117 | (too stiff) | — |
| *14 | 106 | 15.7 | 0.092 |
| 15 | 101 | 11.8 | 0.068 |
| 16 | 119 | 14.8 | 0.05 |

TABLE II-continued

| Run No. | Vicat (°C.) | MFI (g/10min.) | Sp. Visc. (cps.) |
|---|---|---|---|
| 17 | 127 | 2.5 | 0.094 |
| 18 | 128 | 1.6 | — |
| 19 | — | 0.95 | 0.079 |
| 20 | — | 3.4 | 0.21 |

*Runs not illustrative of the invention

Since the reactivity ratios of the monomers are different the polymer on analysis did not always contain the same proportions of the components as were in the original charge.

An indication of the variation is provided by Table III which details the weight composition of changed monomer mix and the polymer composition determined by analysis.

TABLE III

| Run No. | | WEIGHT COMPOSITION | | | |
|---|---|---|---|---|---|
| | | α-MS | AN | MA | S |
| 7 | Charge | 28 | 34 | 15 | 23 |
| | Polymer | 36.5 | 23.5 | 13.4 | 26.6 |
| 10 | Charge | 25 | 40 | 15 | 20 |
| | Polymer | 31.9 | 29 | 12 | 27.1 |
| 11 | Charge | 28 | 34 | 15 | 23 |
| | Polymer | 34.5 | 26 | 11.4 | 28.1 |
| *14 | Charge | 26 | 13 | 21 | 60 |
| | Polymer | 26.7 | 15.5 | 15.1 | 44.7 |
| 17/ | Charge | 28 | 34 | 15 | 23 |
| 18 | Polymer | 34.7 | 25.3 | 12.6 | 27.4 |

*Runs not illustrative of the invention

Several of the polymers obtained in the runs described in Table I were blended with ABS polymers and the products were tested for their physical properties—specifically Vicat distortion temperature and Izod impact strength. The Izod was measured on a bar 12.7 mm + 3.2 mm using the method described in ISO R 180.

The results are set forth in Table IV below.

TABLE IV

| COMPOSITION (P.H.R.) | | | | | | | | | | | | | |
|---|---|---|---|---|---|---|---|---|---|---|---|---|---|
| ABS-1 | 27.2 | 27.2 | 27.2 | 27.2 | 27.2 | 27.2 | 27.2 | 27.2 | 27.2 | 27.2 | 35.0 | 40.0 | 27.2 |
| ABS-2 | 19.4 | 19.4 | 19.4 | 19.4 | 19.4 | 19.4 | 19.4 | 19.4 | 19.4 | 19.4 | 42.9 | 20.0 | 19.4 |
| α-M-SAN TETRAPOLYMER RUN | | | | | | | | | | | | | |
| 6 | 53.4 | | | | | | | | | | | | |
| 7 | | 53.4 | | | | | | | | | | | |
| 9/10 | | | 53.4 | | | | | | | | | | |
| 11 | | | | 53.4 | | | | | | | | | |
| *12/13 | | | | | 53.4 | | | | | | | | |
| *14 | | | | | | 53.4 | | | | | | | |
| 17/18 | | | | | | | 53.4 | | | | | | |
| 19 | | | | | | | | 53.4 | | | | | |
| 20 | | | | | | | | | 53.4 | | | | |
| 24 | | | | | | | | | | | | | |
| RUBBER CONTENT % | 13.6 | 13.6 | 13.6 | 13.6 | 13.6 | 13.6 | 13.6 | 13.6 | 13.6 | 26.7 13.6 | 22.1 20 | 40.0 18.8 | 53.4 13.6 |
| PROPERTIES | | | | | | | | | | | | | |
| Vicat (5kg) °C. | 103 | 104 | 105 | 109 | 105 | 94 | 109 | 107 | 107 | 109 | 102 | 107 | 115 |
| Izod. J/M. | 54 | 358 | 114 | 86 | 29 | 19 | 99 | 107 | 79 | 178 | 271 | 240 | 123 |
| M.F.I. gm. × $10^{-1}$ | — | — | — | — | — | — | — | — | —4.4 | — | 0.3 | — | |

*Not within the invention.

ABS-1 The product obtained by emulsion polymerizing styrene and acrylonitrile a weight ratio of 70:30 in the presence of polybutadiene. ABS-1 contains 40% by weight of polybutadiene.

ABS-2 The product obtained by suspension polymerizing styrene and acrylonitrile in a weight ratio of 73/27 in presence of polybutadiene. ABS-2 contains 14% polybutadiene.

αM-SAN - A copolymer of 70% α-methyl styrene and 30% acrylonitrile (% by weight)

MFI - Melt Flow Index (220° C., 10Kg)

What is claimed is:

1. A process for the production of a thermoformable composition which comprises sequentially:

A. forming a reaction mixture comprising styrene, α-methyl styrene, an ethylenically unsaturated nitrile and an ethylenically unsaturated dicarboxylic acid anhydride wherein the weight proportions of the components are such that:
 (i) styrene+α-methyl styrene represents from 45-60%;
 (ii) nitrile+anhydride represents from 40-55%;
 (iii) α-methyl styrene represents from 10-50%; and
 (iv) nitrile and anhydride each individually represent at least 10% of the monomers present in the reaction mixture;

B. initiating and continuing polymerization of the mixture in the absence of a dispersing medium till at least 40% conversion; and C. substantially completing polymerization in aqueous suspension.

2. A process according to claim 1 in which, after completion of the polymerization process, the polymer is subjected to a heat treatment above 180° C. to drive off water and reform at least some of the anhydride groups hydrolyzed during the suspension polymerization operation.

3. A process according to claim 2 in which the polymeric product is blended with a diene rubber grafted with a vinyl-aromatic monomer and an unsaturated nitrile monomer.

* * * * *